(12) United States Patent
Choi et al.

(10) Patent No.: US 11,936,913 B2
(45) Date of Patent: Mar. 19, 2024

(54) WARPING-BASED DECODED PICTURE RESAMPLING SUPPLEMENTARY ENHANCEMENT INFORMATION MESSAGE

(71) Applicant: Tencent America LLC, Palo Alto, CA (US)

(72) Inventors: Byeongdoo Choi, Palo Alto, CA (US); Stephan Wenger, Hillsborough, CA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/850,641

(22) Filed: Jun. 27, 2022

(65) Prior Publication Data

US 2023/0007306 A1 Jan. 5, 2023

Related U.S. Application Data

(60) Provisional application No. 63/215,906, filed on Jun. 28, 2021.

(51) Int. Cl.
*H04N 19/70* (2014.01)
*H04N 19/132* (2014.01)
*H04N 19/167* (2014.01)
*H04N 19/172* (2014.01)
*H04N 19/187* (2014.01)
(Continued)

(52) U.S. Cl.
CPC ........... *H04N 19/70* (2014.11); *H04N 19/132* (2014.11); *H04N 19/167* (2014.11); *H04N 19/172* (2014.11); *H04N 19/187* (2014.11); *H04N 19/30* (2014.11); *H04N 19/44* (2014.11)

(58) Field of Classification Search
CPC .............................. H04N 19/70; H04N 19/132
See application file for complete search history.

(56) References Cited

U.S. PATENT DOCUMENTS

2013/0136185 A1  5/2013 Tian et al.
2014/0267605 A1  9/2014 Thirumalai et al.
(Continued)

OTHER PUBLICATIONS

International Search Report in PCT/US2022/073242, dated Sep. 12, 2022, 3 pages.
(Continued)

*Primary Examiner* — Jerry T Jean Baptiste
(74) *Attorney, Agent, or Firm* — ARENTFOX SCHIFF LLP

(57) ABSTRACT

Aspects of the disclosure provide a method, an apparatus, and non-transitory computer-readable storage medium for video decoding. The apparatus includes processing circuitry that is configured to decode a current picture based on a bitstream. The processing circuitry can determine, from a supplemental enhancement information (SEI) message, a first flag indicating whether a warping process is applied to the current decoded picture. Based on the first flag indicating that the warping process is applied to the current decoded picture, the processing circuitry can determine warping information of the warping process based on the SEI message. The processing circuitry can determine a warped picture from the current decoded picture based on the warping information.

18 Claims, 15 Drawing Sheets

(51) Int. Cl.
  *H04N 19/30*  (2014.01)
  *H04N 19/44*  (2014.01)

(56) References Cited

U.S. PATENT DOCUMENTS

| | | | |
|---|---|---|---|
| 2014/0307048 A1* | 10/2014 | Smolic | H04N 13/178 |
| | | | 348/43 |
| 2015/0271525 A1* | 9/2015 | Hendry | H04N 19/107 |
| | | | 375/240.27 |
| 2016/0142697 A1 | 5/2016 | Budagavi et al. | |
| 2021/0092358 A1 | 3/2021 | Choi et al. | |

OTHER PUBLICATIONS

Written Opinion in PCT/US2022/073242, dated Sep. 12, 2022, 8 pages.
Supplementary European Search Report in 22797615.6, dated Aug. 9, 2023, 10 pages.
Boyce J et al: "Additional SEI messages for VSEI (Draft 3)", 22. JVET Meeting; Apr. 20, 2021-Apr. 28, 2021; Teleconference; (The Joint Video Exploration Team of ISO/IEC JTC1/SC29/WG11 and ITU-T SG.16 ), No. JVET-V2006; May 7, 2021, pp. 1-27.
Boyce J et al: "AHGS: Spherical rotation orientation SEI for coding of 360 video", 117. MPEG Meeting; Jan. 16, 2017-Jan. 20, 2017; Geneva; (Motion Picture Expert Group or ISO/IEC JTC1/SC29/WG11), No. JVET-E0075, Jan. 4, 2017, pp. 1-8.
Bross et al., Versatile Video Coding Editorial Refinements on Draft 10, Joint Video Experts Team (JVET) of ITU-T SG 16 WP 3 and ISO/IEC JTC 1/SC 29, 20th Meeting, by teleconference, Oct. 7-16, 2020, Document: JVET-T2001-V2, pp. 1-511.

\* cited by examiner

WARPING-BASED DECODED PICTURE RESAMPLING SUPPLEMENTARY ENHANCEMENT INFORMATION MESSAGE

INCORPORATION BY REFERENCE

This present disclosure claims the benefit of priority to U.S. Provisional Application No. 63/215,906, "Techniques for Warping-Based Decoded Picture Resampling SEI Message for Coded Video Stream" filed on Jun. 28, 2021, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image and/or video coding and decoding can be performed using inter-picture prediction with motion compensation. Uncompressed digital image and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding and/or decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding and decoding. In some examples, an apparatus for video decoding includes processing circuitry. The processing circuitry is configured to decode a current picture based on a bitstream. The processing circuitry can determine, from a supplemental enhancement information (SEI) message, a first flag indicating whether a warping process is applied to the current decoded picture. Based on the first flag indicating that the warping process is applied to the current decoded picture, the processing circuitry can determine warping information of the warping process based on the SEI message. The processing circuitry can determine a warped picture from the current decoded picture based on the warping information.

In an embodiment, the SEI message is a display orientation SEI message in the bitstream.

In an embodiment, the SEI message is a warping-based decoded picture resampling (WDPR) SEI message in the bitstream.

In an embodiment, the warping information indicates four corner vectors between corners of the current decoded picture and corresponding corners of the warped picture.

In an embodiment, the processing circuitry determines a vector between a sample position in the current decoded picture and a corresponding position in the warped picture based on the four corner vectors.

In an embodiment, based on the first flag indicating that the warping process indicated by a previous SEI message is cancelled, the warping process is not applied to the current decoded picture.

In an embodiment, the warping information includes a second flag. Based on the second flag having a first value, the SEI message only applies to the current decoded picture. Based on the second flag having a second value, the SEI message applies to the current decoded picture and one or more subsequently decoded pictures of a current layer in an output order until a condition is satisfied.

In an example, the second flag has the second value. The processing circuitry can decode a subsequent picture of the current layer that follows the current picture in the output order. The processing circuitry can determine a warped picture from the subsequently decoded picture based on the warping information.

In an embodiment, the condition includes a new coded layer video sequence (CLVS) of the current layer.

In an embodiment, the warping information indicates a warping mode. The processing circuitry can determine the four corner vectors based on the warping mode.

Aspects of the disclosure also provide a non-transitory computer-readable storage medium storing a program executable by at least one processor to perform the methods for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1A:
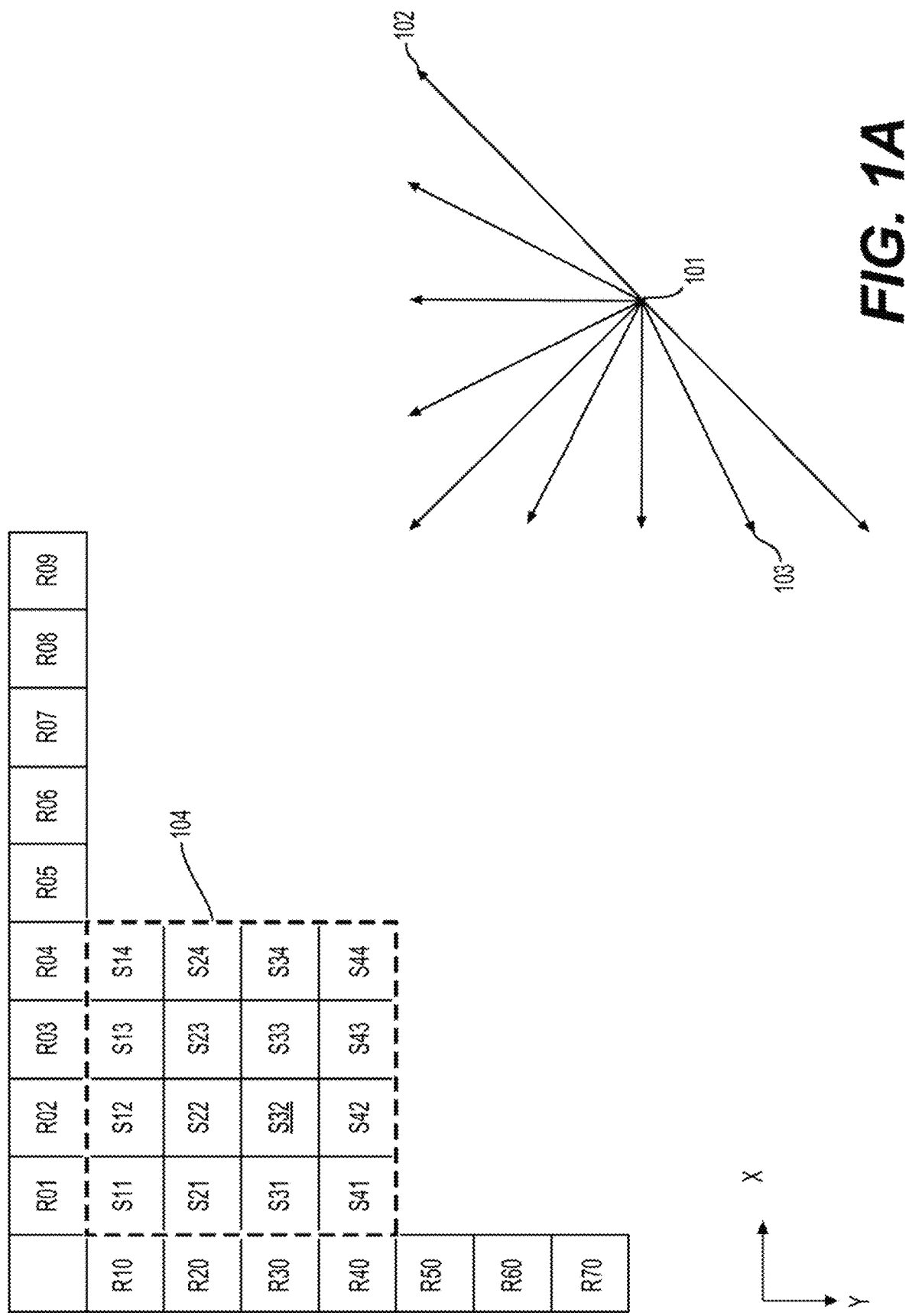
FIG. 1A is a schematic illustration of an exemplary subset of intra prediction modes.
Figure 1B:
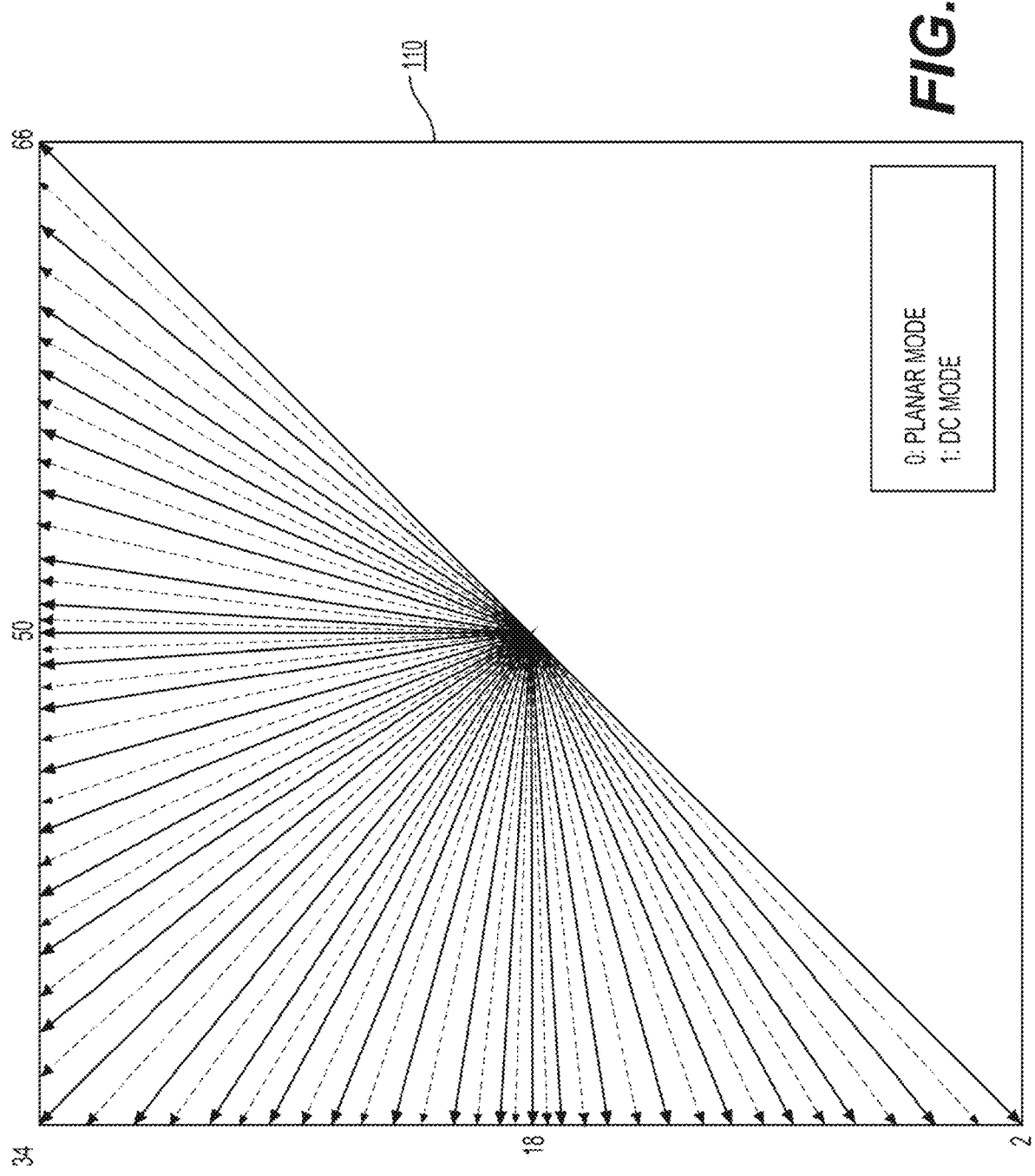
FIG. 1B is an illustration of exemplary intra prediction directions.
Figure 2:
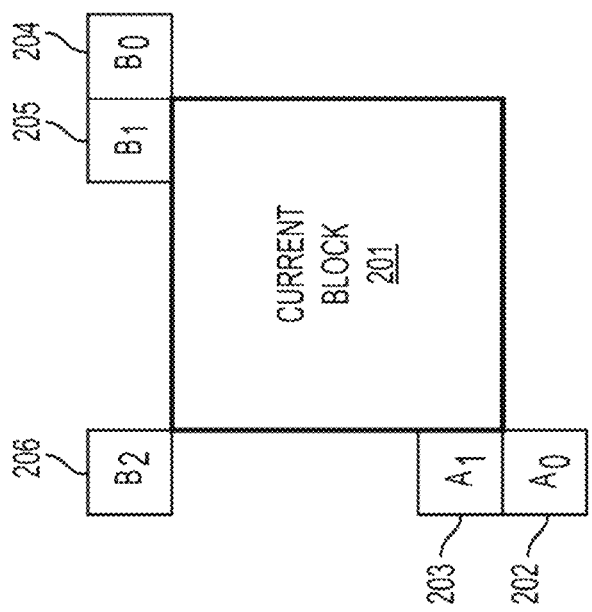
FIG. 2 shows a current block (201) and surrounding samples in accordance with an embodiment.
Figure 3:
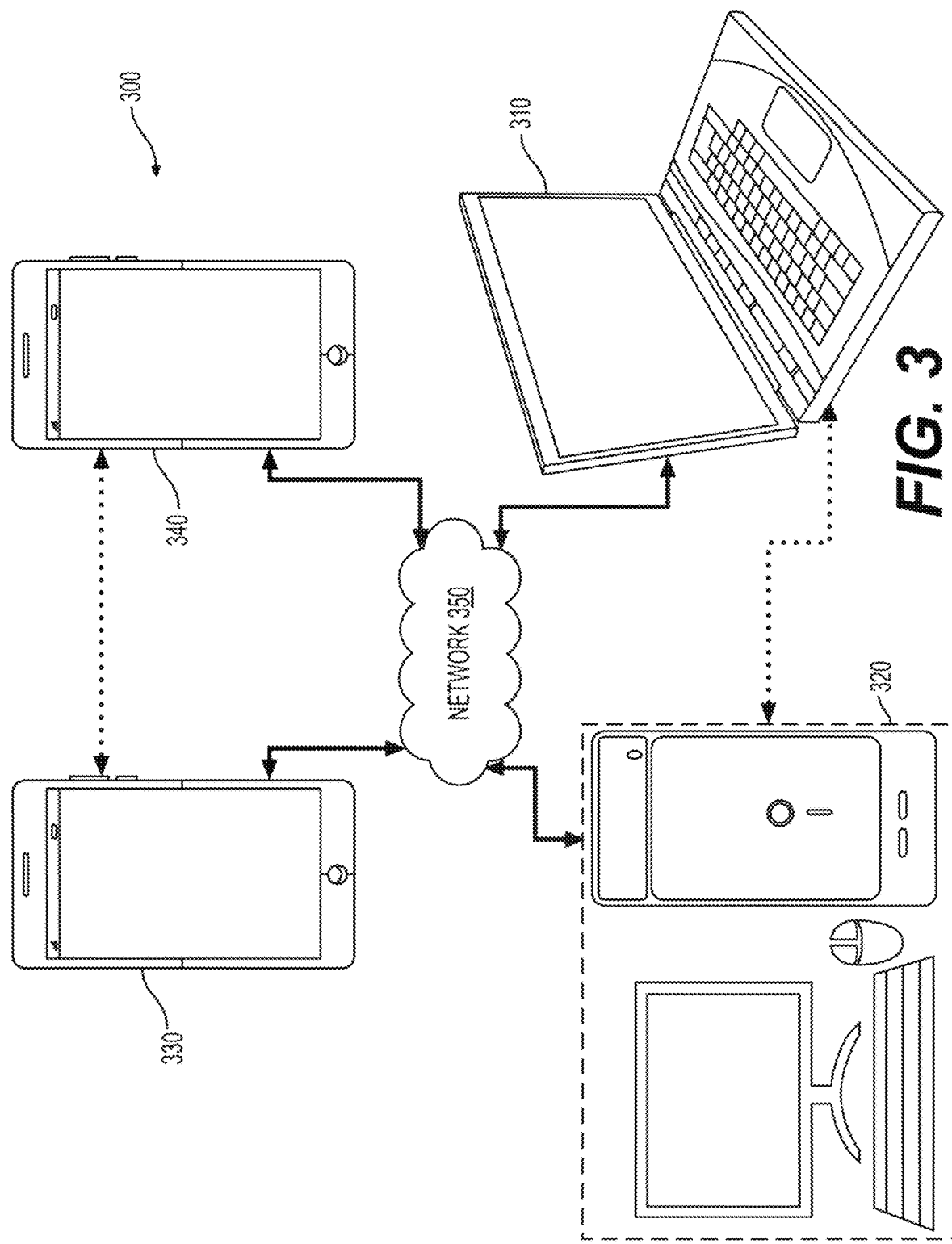
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
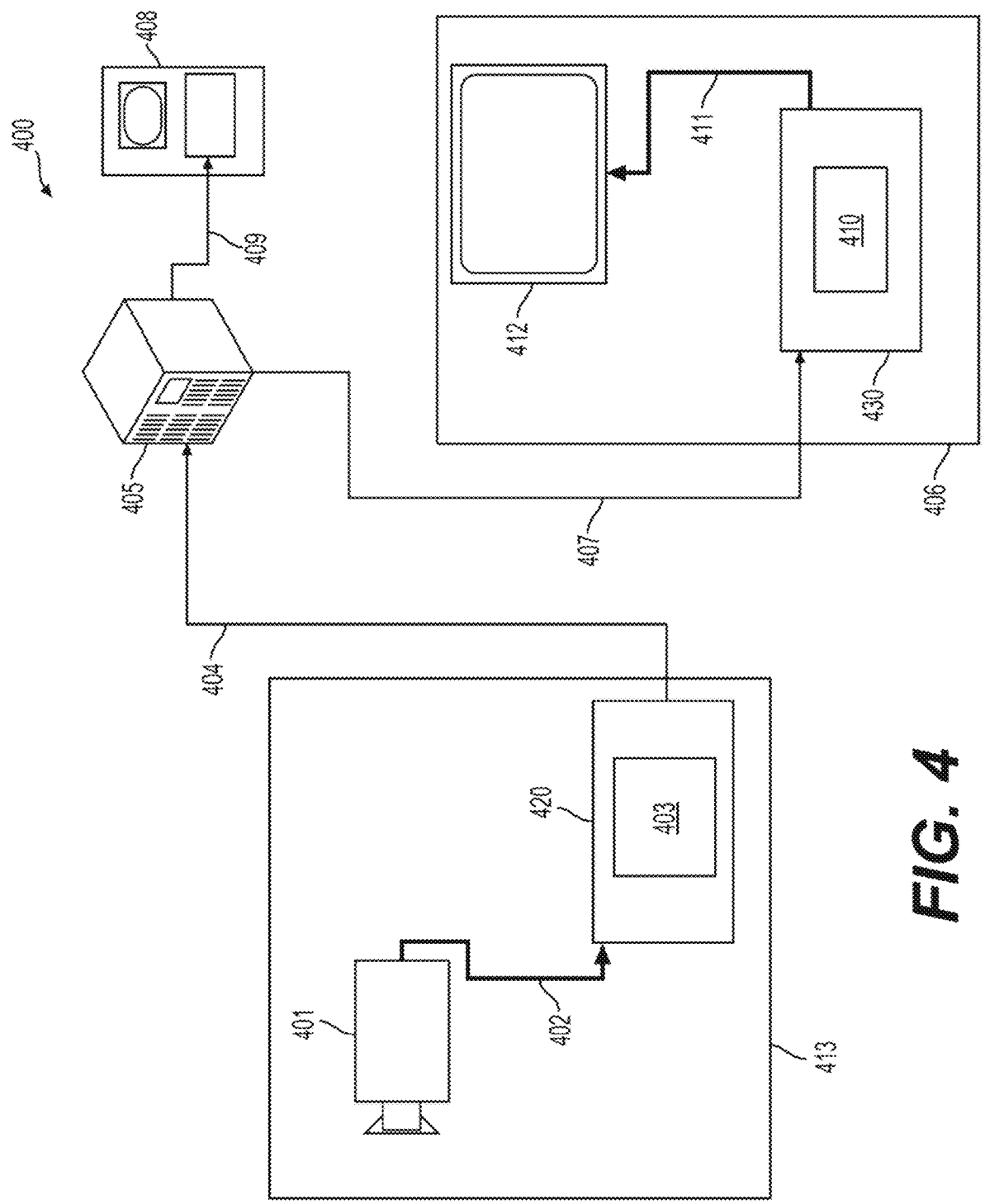
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
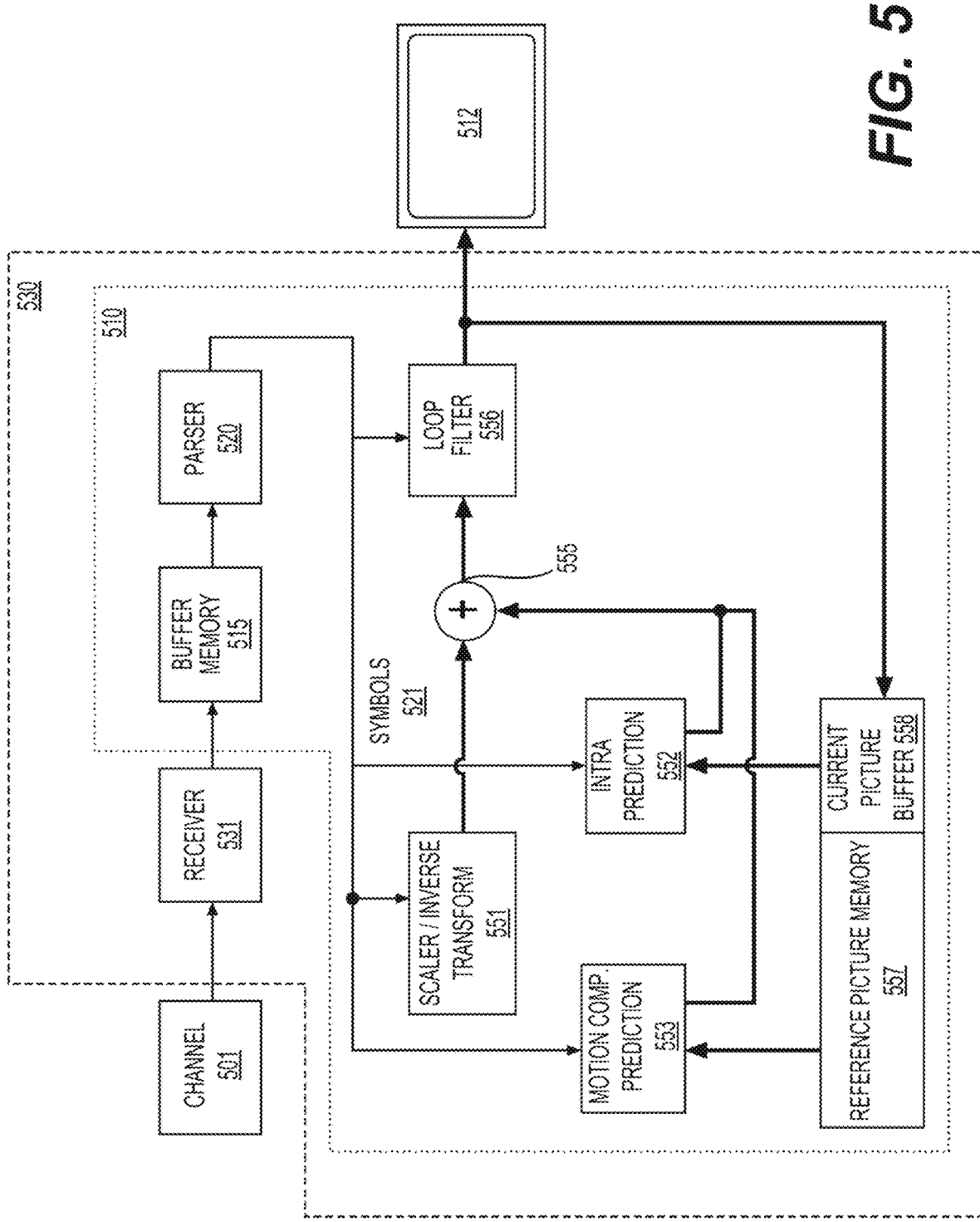
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI) messages or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
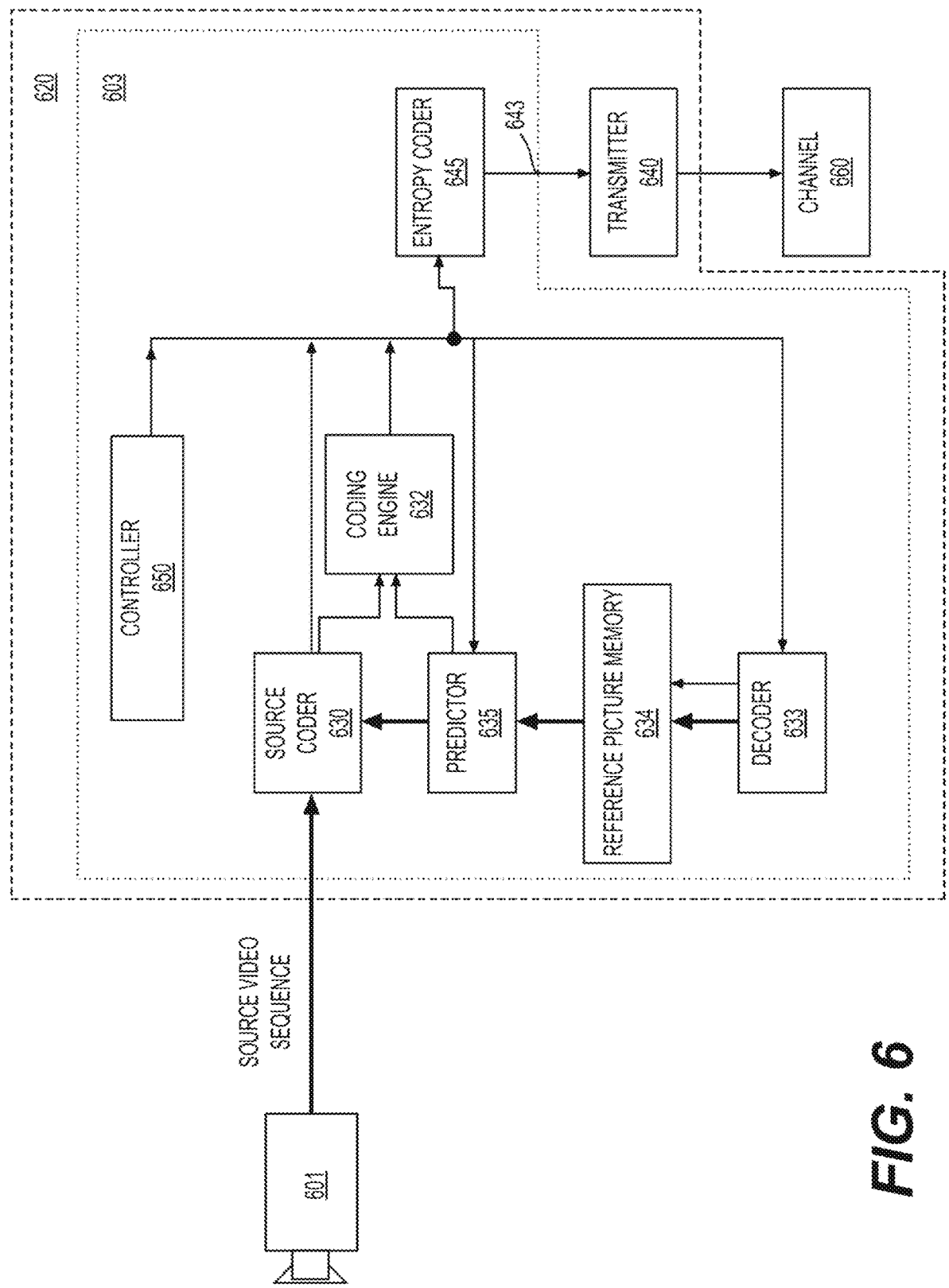
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block.

Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
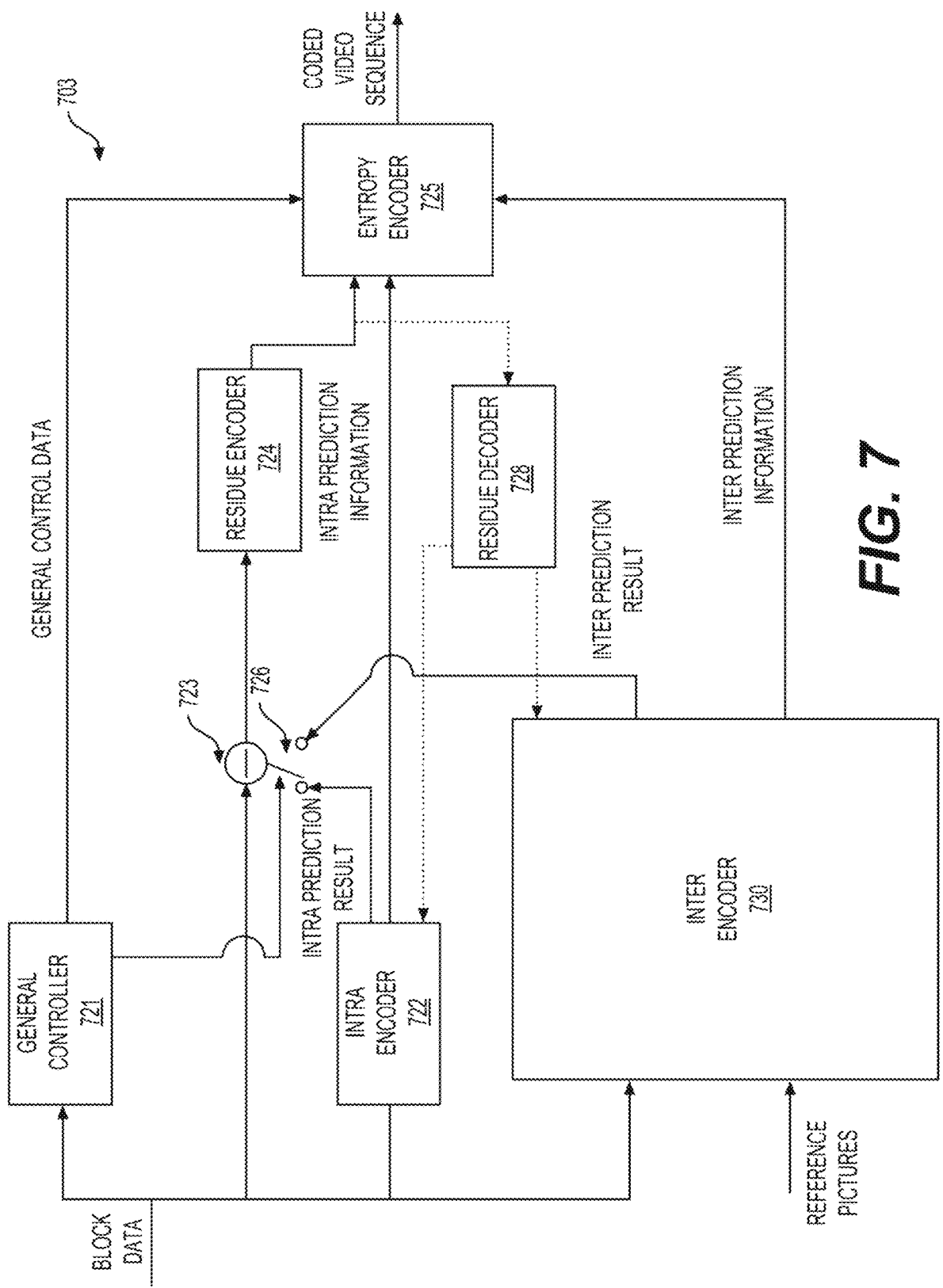
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
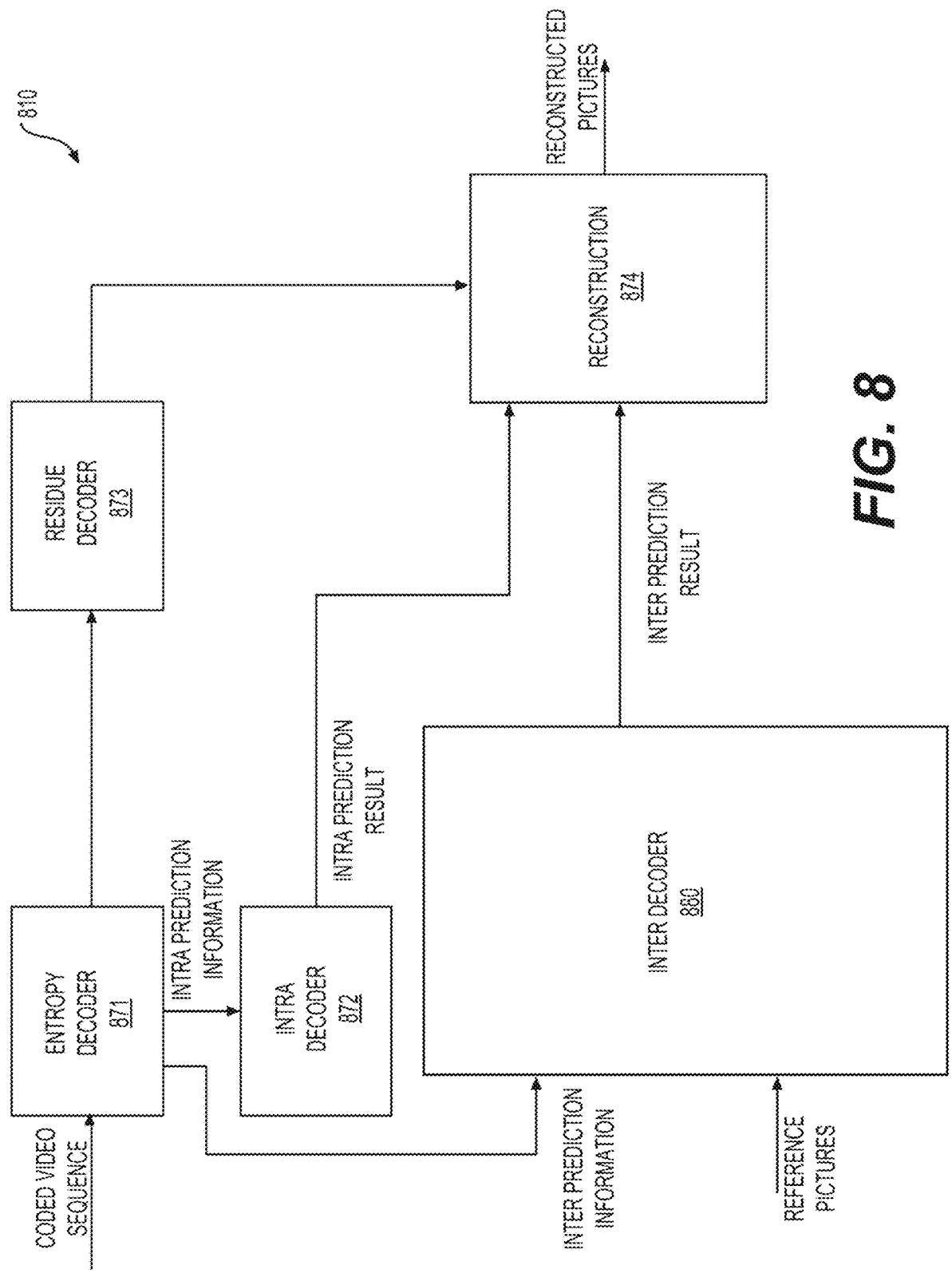
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

According to an embodiment of the disclosure, a bitstream can include one or more coded video sequences (CVSs). A CVS can be independently coded from other CVSs. Each CVS can include one or more layers, and each layer can be a representation of a video with a specific quality (e.g., a spatial resolution), or a representation of a certain component interpretation property, e.g., as a depth map, a transparency map, or a perspective view. In a temporal dimension, each CVS can include one or more access units (AUs). Each AU can include one or more pictures of different layers that correspond to a same time instant. A coded layer video sequence (CLVS) is a layer-wise CVS that can include a sequence of picture units in the same layer. If a bitstream has multiple layers, a CVS in the bitstream can have one or more CLVSs for each layer.

In an embodiment, a CVS includes a sequence of AUs where the sequence of AUs includes, in a decoding order, an intra random access point (IRAP) AU, followed by zero or more AUs that are not IRAP AUs. In an example, the zero or more AUs includes all subsequent AUs up to but not including any subsequent AU that is an IRAP AU. In an example, a CLVS includes a sequence of pictures and the associated non-video coding layer (VCL) network abstraction layer (NAL) units of a base layer of a CVS.

SEI message(s) can include information that is not necessary for decoding, such as decoding samples of coded pictures from VCL NAL units. SEI message(s) can be used in processes related to decoding, display or other purposes. SEI message(s) can be optional for constructing luma or chroma samples by a decoding process. SEI message(s) may be optionally processed by conforming decoders for output order conformance to a certain standard (e.g., HEVC 265 or VVC). In an embodiment, SEI message(s) are present in the bitstream.

Table 1 shows an exemplary display orientation SEI message syntax according to an embodiment of the disclosure.

TABLE 1

Exemplary display orientation SEI message syntax

|  | Descriptor |
|---|---|
| display_orientation( payloadSize ) { |  |
|   display_orientation_cancel_flag | u(1) |
|   if( !display_orientation_cancel_flag ) { |  |
|     hor_flip | u(1) |
|     ver_flip | u(1) |
|     anticlockwise_rotation | u(16) |
|     display_orientation_persistence_flag | u(1) |
|   } |  |
| } |  |

Display orientation SEI message semantics can be described as follows. When a decoded picture has a picture output flag (e.g., PicOutputFlag) equal to 1, the display orientation SEI message can inform the decoder of a transformation to be applied to a cropped decoded picture prior to display. A cropped decoded picture can be obtained by cropping a decoded picture based on a cropping window (e.g., a conformance cropping window). In an example, the cropping window is specified in a sequence parameter set (SPS) that is referred to by the corresponding coded picture.

The picture output flag (e.g., PicOutputFlag) can indicate whether to output the decoded picture. For example, when the picture output flag (e.g., PicOutputFlag) is 1, the decoded picture can be sent from a decoded picture buffer as an output. When the picture output flag (e.g., PicOutputFlag) is 0, the decoded picture may not be sent from the decoded picture buffer as an output.

The display_orientation_cancel_flag being equal to 1 can indicate that the display orientation SEI message cancels the persistence of any previous display orientation SEI message in an output order. The display_orientation_cancel_flag being equal to 0 can indicate that display orientation information follows. The display orientation information can include a horizontal flip flag, a vertical flip flag, an anti-clockwise rotation, and a display orientation persistence flag.

The horizontal flip flag (e.g., hor_flip) being equal to 1 can indicate that the cropped decoded picture is flipped horizontally for display. The horizontal flip flag (e.g., hor_flip) being equal to 0 can indicate that the decoded picture is not flipped horizontally.

The vertical flip flag (e.g., ver_flip) being equal to 1 can indicate that the cropped decoded picture is flipped vertically (e.g., in addition to a horizontal flipping when hor_flip is equal to 1) for display. The vertical flip flag (e.g., ver_flip) being equal to 0 can indicate that the decoded picture is not flipped vertically.

The anticlockwise rotation (e.g., anticlockwise_rotation) can specify an anticlockwise rotation of the decoded picture (e.g., after applying the horizontal flipping and/or the vertical flipping based on the horizontal flip flag and the vertical flip flag) prior to display.

Equivalent transformations can be expressed in multiple ways using the syntax elements described above.

The display orientation persistence flag (e.g., display_orientation_persistence_flag) can specify the persistence of the display orientation SEI message for the current layer. The display orientation persistence flag (e.g., display_orientation_persistence_flag) being equal to 0 can specify that the display orientation SEI message applies to the current decoded picture only. The display orientation persistence flag (e.g., display_orientation_persistence_flag) being equal to 1 can specify that the display orientation SEI message can persist for the current layer in the output order until one or more conditions are true. The one or more conditions can include: (i) a new CLVS of the current layer begins; (ii) the bitstream ends; and/or (iii) another picture in the current layer in an access unit containing a display orientation SEI message that is applicable to the current layer is output for which a picture order count (POC) of the other picture is greater than a POC of the current picture, immediately after the invocation of the decoding process for picture order count for the other picture.

A resampling process or a warping process can be applied to a picture to generate a resampled picture (or a warped picture). The warping process can be used in reference picture resampling, image stabilization, compensation for global movements, and the like. In an embodiment, the resampling process, such as a reference picture resampling process, is applied to a prior picture (e.g., a previously decoded reference picture) to generate a warped picture for use in predicting a current picture, such as used in H.263 Annex P and described in the disclosure. In an example, a resampling syntax specifies a relationship of the current picture to the prior picture with a different source format. A reference picture resampling mode can be used to adaptively alter resolutions of pictures during encoding. A fast algorithm can be used to generate bilinear interpolation coefficients. In an example, the resampling syntax specifies a global motion warping alteration of a shape, a size, and a location of the prior picture with respect to the current picture, for example, due to a global movement.

Figure 9:
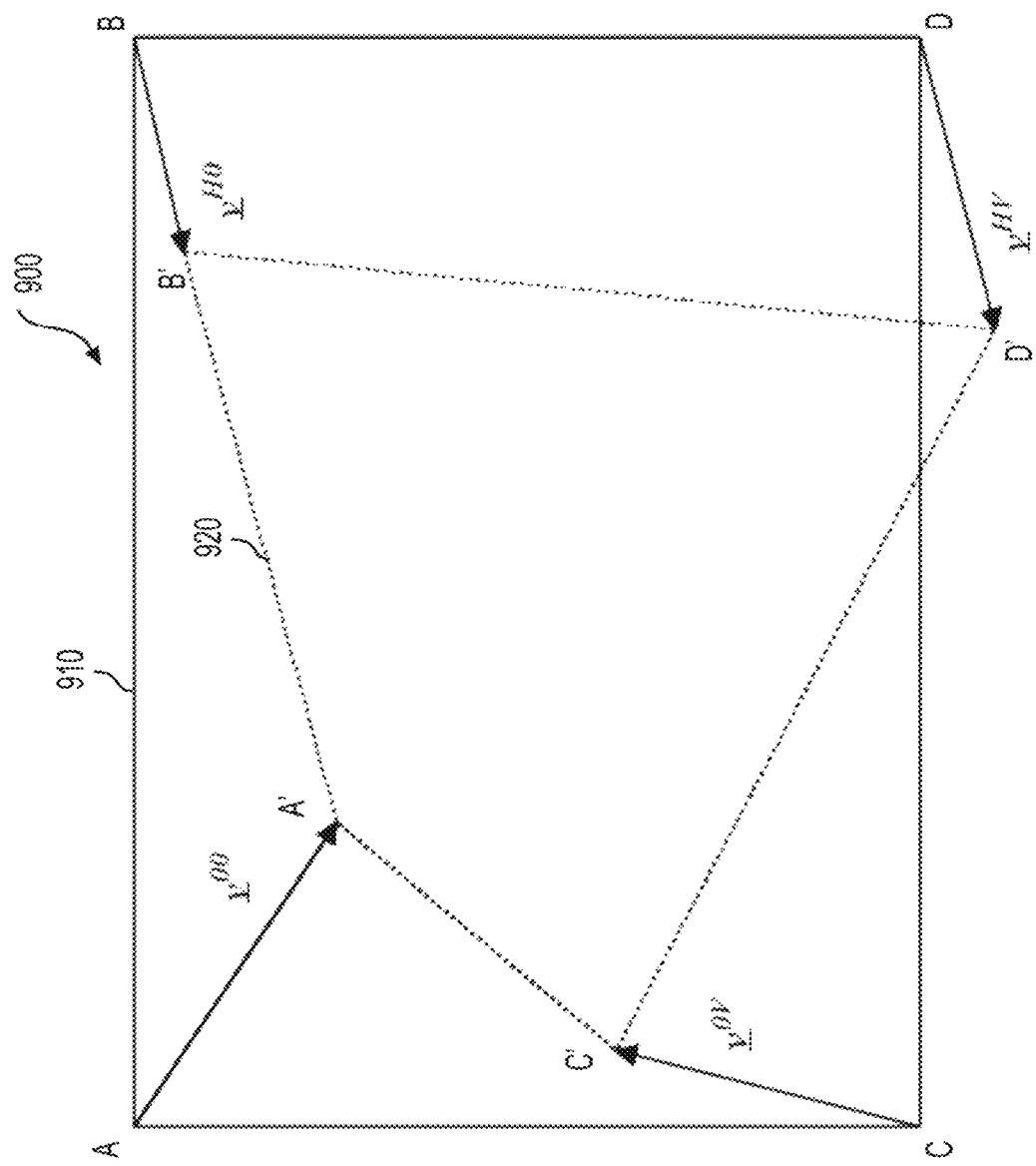
FIG. 9 shows exemplary vectors used for warping according to an embodiment of the disclosure.

FIG. 9 shows exemplary vectors used for warping according to an embodiment of the disclosure. The resampling process (e.g., the reference picture resampling) (900) can be described with displacements of four corners A-D of the current picture area (910). For a luminance field of the current picture (910) with a horizontal size H and a vertical size V, four vectors (e.g., four conceptual MVs) $v^{00}$, $v^{H0}$, $v^{0V}$, $v^{HV}$ can be defined for an upper-left corner A, an upper-right corner B, a lower-left corner C, and a lower-right corner D of the picture (910), respectively. The four conceptual MVs $v^{00}$, $v^{H0}$, $v^{0V}$, $v^{HV}$ can describe how to move the four corners A-D of the current picture (910) to map the four corners A-D onto corresponding corners A'-D' of the previous decoded picture (920). The units of the four vectors $v^{00}$, $v^{H0}$, $v^{0V}$, $v^{HV}$ can be the same as the units in a reference picture grid. To generate a vector v(x, y) at a real-valued location (x, y) in the interior of the current picture (910), an approximation to bilinear interpolation can be used as in Eq. 1.

$$\underline{v}(x,\ y) = \left(1 - \frac{y}{V}\right)\left[\left(1 - \frac{x}{H}\right)\underline{v}^{00} + \left(\frac{x}{H}\right)\underline{v}^{H0}\right] + \left(\frac{y}{V}\right)\left[\left(1 - \frac{x}{H}\right)\underline{v}^{0V} + \left(\frac{x}{H}\right)\underline{v}^{HV}\right] \quad \text{Eq. 1}$$

The resampling process can be based on the vector v(x, y). The horizontal size H and the vertical size V of the current picture, and a horizontal size HR and a vertical size VR of the reference picture can be indicated in a picture header. In an example, if the picture width or the picture height is not divisible by 16, the additional area can be generated by adding pixels to the resampled picture using a same fill mode as used in the resampling process.

In addition to the reference picture resampling, the warping process can be used in image stabilization and/or compensation for global movements, and warping information indicating warping parameters (e.g., the four vectors) can be signaled. The warping parameters can be included in a SEI message, as described below.

This disclosure includes video coding technologies related to a SEI message (e.g., a warping-based decoded picture resampling (WDPR) SEI message) for a coded video stream. A warping process can be used in image stabilization where the SEI message (e.g., the WDPR SEI message) can provide warping parameters used in the image stabilization to reduce unintended fluctuated motions in a video.

A warping process can be used to compensate for global movements (or global motions) in a plurality of input pictures where the warping parameters in the SEI message (e.g., the WDPR SEI message) can be used for more efficient or improved motion compensated prediction. In an embodiment, the warping process includes a forward warping process applied to a plurality of input pictures as a pre-processing and a backward warping process applied to a plurality of decoded pictures as a post-processing. In an example, the plurality of decoded pictures corresponds to the plurality of input pictures.

The SEI message can be adopted as a new SEI message, such as the WDPR SEI message. Alternatively, the SEI message can be combined with another existing SEI message, such as the display orientation SEI message described above with reference to Table 1. In an example, the warping process is based on the resampling process described above with reference to FIG. 9, such as used in H.263 Annex P.

Image stabilization is widely used to reduce undesired motion jitters in image sequences. For example, motion jitters occur with camera shaking or rapidly moving objects while rolling a shutter of the camera. The motion anomalies caused by unstable external sources or environments may lead to unpleasant visual effects in video sequences. To improve a subjective visual quality, a warping process can be applied to decoded pictures. The warping processing can be applied as a post-processing, for example, on a decoder side.

Figure 10A:
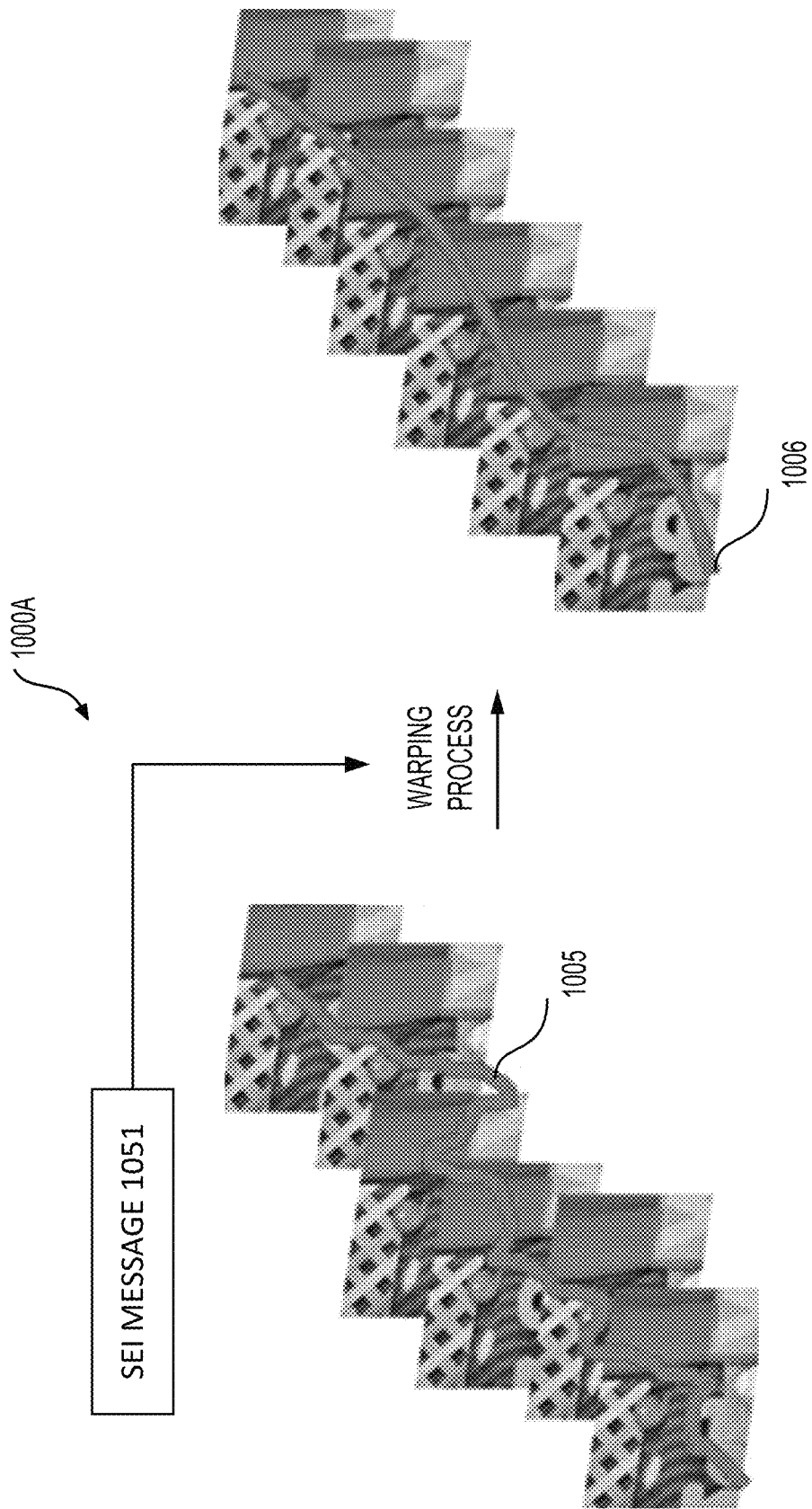
FIG. 10A shows an exemplary warping process in image stabilization according to an embodiment of the disclosure.

FIG. 10A shows an exemplary warping process (1000A) in image stabilization according to an embodiment of the disclosure. A capture-side device can determine (e.g., detect or sense) camera jitters and other external movements. Frame-wise or picture-wise movements can be parameterized into warping information (e.g., warping parameters). In the example shown in FIG. 10A, the parameterized warping information is transmitted to a decoder-side, such as through an SEI message (1051). A decoder can apply the warping process (e.g., the image stabilization processing) (1000A) to decoded pictures (1053) by utilizing the received warping information. In an example, the decoded pictures (1053) are cropped output pictures with motion jitters (1005). Warped pictures (1055) can be generated from the cropped output pictures (1053) by the warping process (1000A). The motion jitters (1005) in the cropped output pictures (1053) can be reduced to generate stabilized pictures, such as the warped pictures (1055) having reduced motion jitters (1006).

Figure 10B:
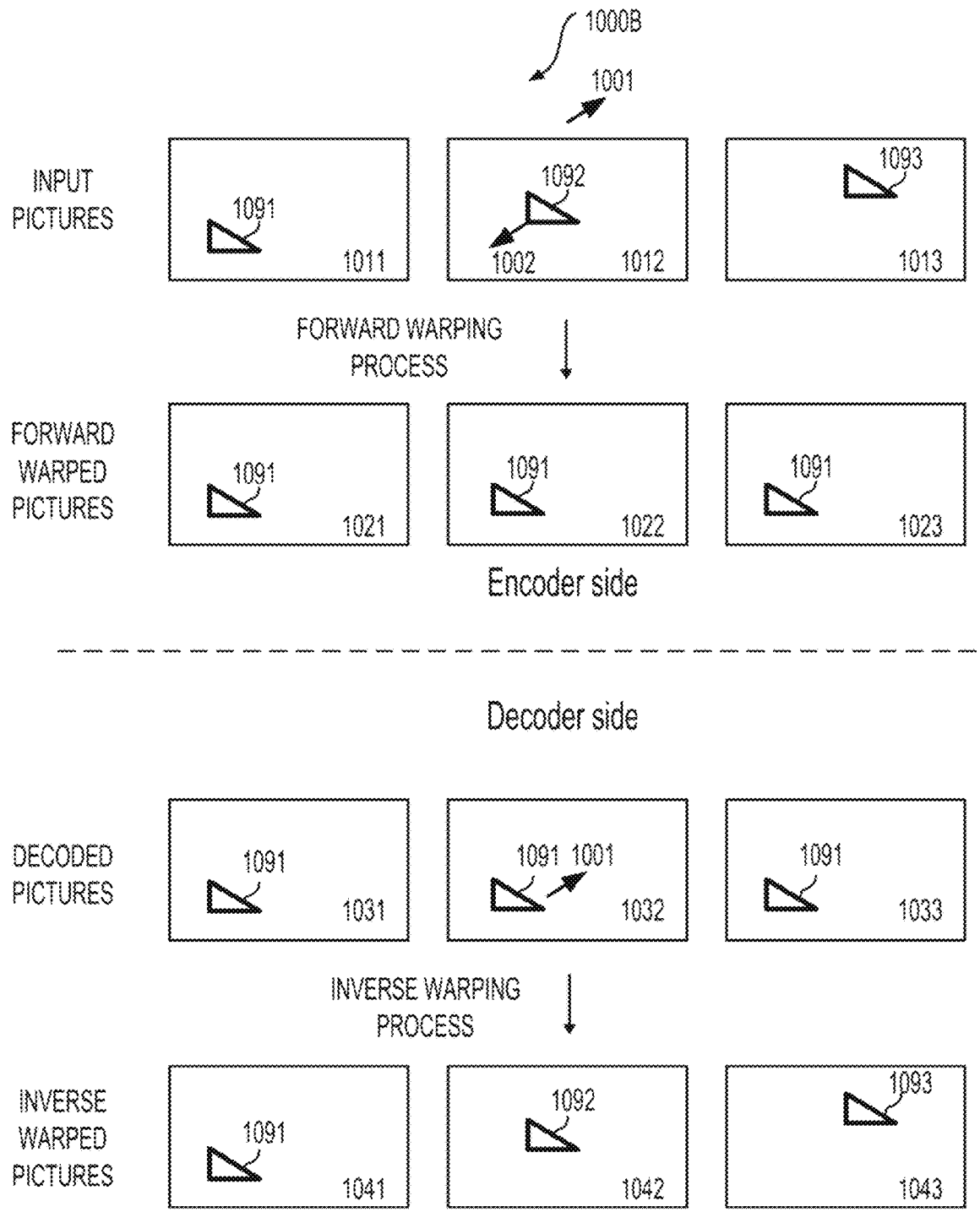
FIG. 10B shows an exemplary warping process to compensate for global movements in a plurality of input pictures according to an embodiment of the disclosure.

As described above, the warping parameters in an SEI message (e.g., the WDPR SEI message) can be used for motion compensated prediction by applying a forward warping process to a plurality of input pictures as a pre-processing and a backward warping process to a plurality of decoded pictures as a post-processing. FIG. 10B shows an exemplary warping process (1000B) to compensate for global movements in a plurality of input pictures according to an embodiment of the disclosure. In an example, the plurality of input pictures (1011)-(1013) is a part of a CLVS. The plurality of input pictures (1011)-(1013) shows a global movement, such as a shift toward an upper-right direction indicated by a vector (1001). For example, a same feature is located at different positions (1091)-(1093) in the plurality of input pictures (1011)-(1013), respectively. A displacement between positions (e.g., the positions (1091)-(1092)) of the feature in adjacent pictures (e.g., (1011)-(1012)) is the vector (1001). At an encoder side, the global movement (e.g., the vector (1001)) can be determined based on the plurality of input pictures (1011)-(1013). According to an embodiment of the disclosure, the warping process (1000B) can be applied to the plurality of input pictures to improve coding efficiency as follows.

Referring to FIG. 10B, at the encoder side, a transform, such as a shifting operation that is opposite to the global movement, can be determined based on the global movement of the plurality of input pictures (1011)-(1013). The warping parameter(s), such as a vector (1002) that is opposite to the vector (1001), can be determined. A forward warping process based on the vector (1002) can be applied to the plurality of input pictures (1011)-(1013) to compensate for the global movement. For example, forward warped pictures (1021)-(1023) are generated from the corresponding input pictures (1011)-(1013) based on the vector (1002). Referring to FIG. 10B, static pictures (e.g., (1021)-(1023)) having similar or identical features are generated from a video sequence (e.g., the input pictures (1011)-(1013)) having different features, and thus coding efficiency is improved as coding the static pictures having similar features can be more efficient than coding the video sequence having different features.

The forward warped pictures (1021)-(1023) can be encoded at the encoder side to form coded pictures. In an example, warping information including warping parameter(s) (e.g., the vector (1002)) or the vector (1001)) is parameterized and coded into an SEI message (e.g., the WDPR SEI message). In an example, the warping information (e.g., including the vector (1001)) to be used in an inverse warping process at a decoder side is denoted as inverse warping information. The coded pictures and the SEI message can be transmitted to the decoder-side.

Referring to FIG. 10B, at the decoder side, the coded pictures can be decoded into decoded pictures (1031)-(1033) that correspond to the input pictures (1011)-(1013), respectively. The warping parameter(s) (e.g., the vector (1002) or the vector (1001)) can be determined based on the warping information in the encoded SEI message. In order to recover the original positions (1091)-(1093), an inverse warping process can be applied to the decoded pictures (1031)-(1033) to generate inverse warped pictures (1041)-(1043), and thus recovering the original global movement. In an example shown in FIG. 10B, the inverse warping process includes a shift of the decoded pictures toward an upper-right direction based on the vector (1001).

The warping process (1000B) can be suitably adapted when the global movement is more complex, such as a global movement including a warping alteration of shape(s), size(s), and location(s) of a sequence of pictures. In an example, the global movement is represented by the four vectors in FIG. 9, and the warping process (1000B) can be based on the four vectors as described with reference to FIG. 9.

Figure 11:
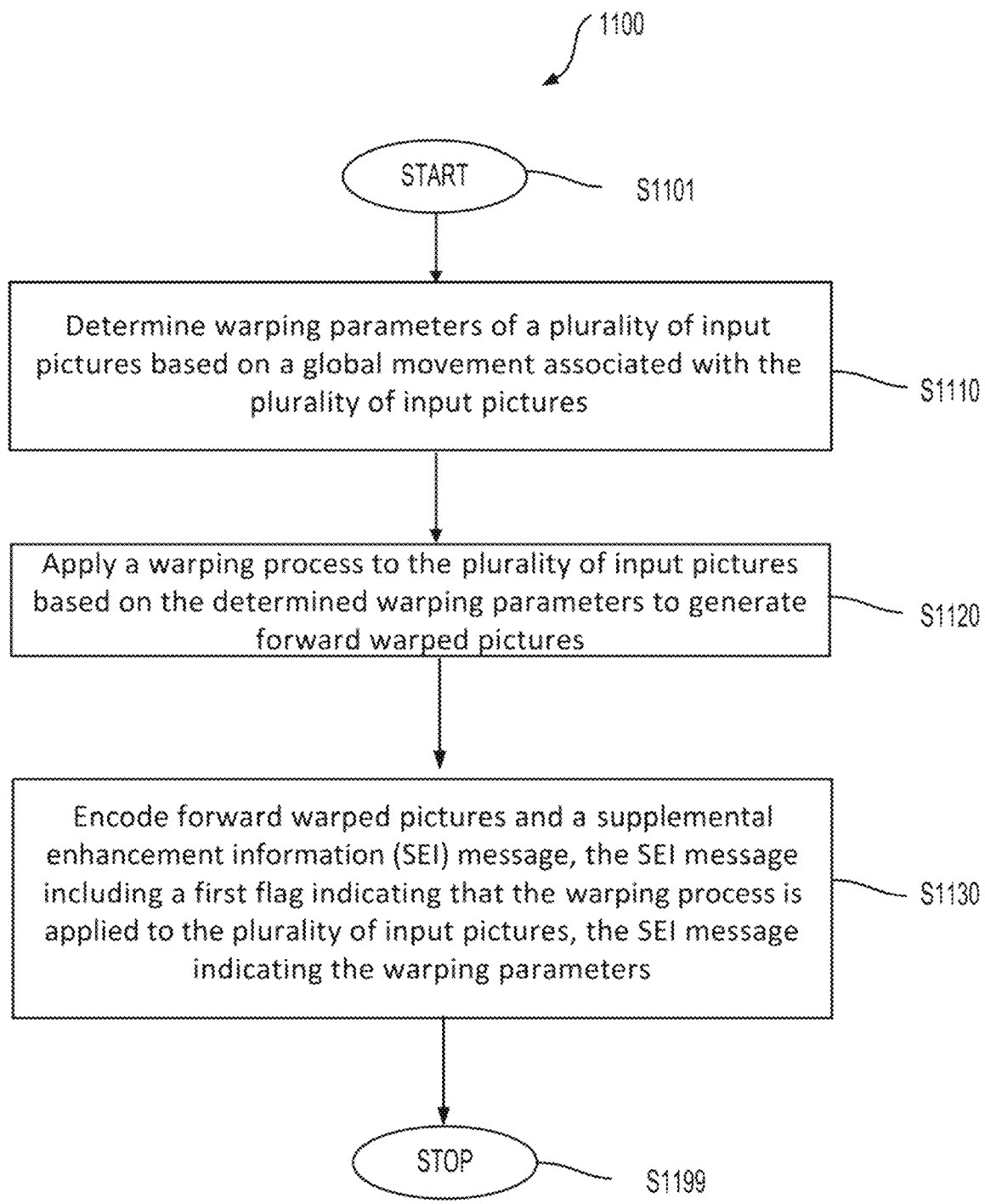
FIG. 11 shows a flow chart outlining an encoding process according to an embodiment of the disclosure.

FIG. 11 shows a flow chart outlining an encoding process (1100) according to an embodiment of the disclosure. The process (1100) can be used to encode a plurality of input pictures. In an example, the process (1100) includes performing a forward warping process. In various embodiments, the process (1100) is executed by processing circuitry, such as the processing circuitry in the terminal devices (310), (320), (330) and (340), processing circuitry that performs functions of a video encoder (e.g., (403), (603), (703)), or the like. In some embodiments, the process (1100) is implemented in software instructions, thus when the processing circuitry executes the software instructions, the processing circuitry performs the process (1100). The process starts at (S1101), and proceeds to (S1110).

At (S1110), warping parameters of a plurality of input pictures can be determined based on a global movement associated with the plurality of input pictures. The global movement can include a warping alteration of the plurality of input pictures. The warping alteration can include change(s) to a shape(s), size(s), and/or location(s) of the plurality of input pictures. The global movement can include any movement or a combination of movements, such as a translation(s), a rotation(s), and changes to a shape(s) of the plurality of input pictures. For example, when the global movement includes more than translation(s) (e.g., a translation denoted by the vector (1002) or (1001) in FIG. 10B), the global movement may be represented by multiple vectors, such as the four vectors $v^{00}$, $v^{H0}$, $v^{0V}$, $v^{HV}$ shown in FIG. 9. The warping parameters can include a horizontal component(s) and a vertical component(s) of (i) a single vector (e.g., (1001) or (1002)) or (ii) multiple vectors (e.g., $v^{00}$, $v^{H0}$, $v^{0V}$, $v^{HV}$).

At (S1120), a warping process can be applied to the plurality of input pictures based on the determined warping parameters. For example, the warping process is a forward warping process such as described with reference to FIG. 10B. Forward warped pictures (e.g., (1021)-(1023)) can be generated where a global movement of the forward warped pictures is less than the global movement of the plurality of input pictures (e.g., (1011)-(1013)). Accordingly, encoding the forward warped pictures can be more efficient than encoding the plurality of input pictures directly.

The step (S1120) can be omitted in some applications when the process (1100) is used in certain applications, for example image stabilization, such as in FIG. 10A.

At (S1130), the forward warped pictures can be encoded into a bitstream. A supplemental enhancement information (SEI) message can be encoded where the SEI message can include a first flag indicating that the warping process is applied to the plurality of input pictures. The SEI message can indicate the warping parameters determined in (S1110). In an example, the SEI message is included in the bitstream.

According to an embodiment of the disclosure, the warping process can be based the resampling process described with reference to FIG. 9. The SEI message can be a WDPR SEI message. Table 2 shows an exemplary syntax of the WDPR SEI message syntax.

TABLE 2

| Warping-based decoded picture resampling SEI message syntax | |
|---|---|
|  | Descriptor |
| warping_based_decoded_picture_resampling( payloadSize ) { |  |
|   warping_based_decoded_picture_resampling_cancel_flag | u(1) |
|   if( !warping_based_decoded_picture_resampling_cancel_flag ) { |  |
|     warping_based_decoded_picture_resampling_persistence_flag | u(1) |
|     warping_mode_idc | u(4) |
|     if( warping_mode == 0 ) { |  |
|       for( i = 0; i < 4; i++ ) { |  |
|         corner_vector_x[ i ] | se(v) |
|         corner_vector_y[ i ] | se(v) |
|       } |  |
|     } |  |
|   } |  |
| } |  |

The WDPR SEI message semantics can be described as below. The WDPR SEI message can provide information to enable a warping process of reconstructed samples of output pictures (e.g., decoded pictures) on a decoder side. In an example, the output pictures (e.g., the decoded pictures) are in a current layer and are part of a CLVS. Referring to FIG. 10A, the WDPR SEI message can provide information to enable the warping process (1000A) of reconstructed samples of output pictures (e.g., the decoded pictures (1053)) for purposes such as converting the output pictures to motion stabilized pictures (e.g., the warped pictures (1055)) that provide better visual experiences. Referring to FIG. 10B, the WDPR SEI message can provide information to enable a warping process (e.g., the inverse warping process in FIG. 10B) of reconstructed samples of output pictures (e.g., the decoded pictures (1031)-(1033)) to recover the original global movement.

The first flag (e.g., warping_based_decoded_picture_resampling_cancel_flag) being true (e.g., equal to 1) can indicate that the WDPR SEI message cancels the persistence of any previous WDPR SEI messages in an output order that applies to a current layer. The first flag (e.g., warping_based_decoded_picture_resampling_cancel_flag) being false (e.g., equal to 0) can indicate that the warping information (e.g., WDPR information) follows. In an example, the warping information is signaled when the first flag (e.g., warping_based_decoded_picture_resampling_cancel_flag) is false.

In an example, the first flag (e.g., warping_based_decoded_picture_resampling_cancel_flag) indicates whether the warping process is applied to the plurality of input pictures. The first flag being true (e.g., equal to 1) can indicate that no warping process is applied to the plurality of input pictures. The first flag being false (e.g., equal to 0) can indicate that the warping process is applied to the plurality of input pictures.

The warping information can include a second flag (e.g., warping_based_decoded_picture_resampling_persistence_flag), a warping mode identifier (e.g., warping_mode_idc), and warping parameters.

The second flag (e.g., warping_based_decoded_picture_resampling_persistence_flag) can specify the persistence of the WDPR SEI message. The persistence can be specified for the current layer, for example. The second flag (e.g., the warping_based_decoded_picture_resampling_persistence_flag) being false (e.g., equal to 0) can specify that the WDPR SEI message applies to a current decoded picture only. For example, the current decoded picture is one of the output pictures in the current layer. The second flag (e.g., the warping_based_decoded_picture_resampling_persistence_flag) being true (e.g., equal to 1) can specify that the WDPR SEI message applies to the current decoded picture and persists for all subsequent pictures of the current layer in the output order until one or more conditions are true. The condition can include one or more of (i) a new CLVS of the current layer begins; (ii) the bitstream ends; and (iii) a picture in the current layer in an AU associated with a WDPR SEI message (e.g., different from the WDPR SEI message for the current decoded picture) is output that follows the current decoded picture in the output order.

The warping mode identifier (e.g., warping_mode_idc) can specify a warping mode that is applied to the output pictures (e.g., cropped output pictures). In an example, the warping mode identifier (e.g., warping_mode_idc) being equal to 0 specifies that the warping process described above with reference to FIG. 9 (e.g, used in H.263 Annex P) with four corner vectors including eight parameters is applied. The warping parameters can include the four corner vectors or the eight parameters. When the warping mode identifier (e.g., warping_mode_idc) is equal to 0, the four corner vectors denoted as (corner_vector_x[i], corner_vector_y[i]) are present in the SEI message. Other values of the warping mode identifier can indicate other warping modes. In an example, values greater than 1 for the warping mode identifier (e.g., warping_mode_idc) are reserved for future use, such as by ITU-T|ISO/IEC.

A corner vector is denoted by variables corner_vector_x[i] and corner_vector_y[i]. Referring back to FIG. 9, the warping parameters, such as values of the four corner vectors $v^{00}$, $v^{H0}$, $v^{0V}$, $v^{HV}$, can be determined by (corner_vector_x[0], corner_vector_y[0]), (corner_vector_x[1], corner_vector_y[1]), (corner_vector_x[2], corner_vector_y[2]), and (corner_vector_x[3], corner_vector_y[3]), respectively.

The process (1100) proceeds to (S1199), and terminates.

The process (1100) can be suitably adapted to various scenarios and steps in the process (1100) can be adjusted accordingly. One or more of the steps in the process (1100) can be adapted, omitted, repeated, and/or combined. Any suitable order can be used to implement the process (1100). Additional step(s) can be added.

In an example, the warping information described with reference to Table 2 is included in another SEI message, such as the display orientation SEI message. For example, one or more syntax elements in Table 2 are combined with the syntax elements in Table 1.

In an example, the process (1100) is used in certain applications that do not require step (S1120). For example, with the application is image stabilization, (S1120) can be omitted. The warping information in the SEI message can be used by a decoder at a decoder side to perform a warping process based on the warping information. (S1130) can be adapted such that the plurality of input pictures is encoded, instead of the forward warped pictures.

In an example, the process (1100) is used to reduce a global movement, and (S1120) is performed as the forward warping process. The warping information in the SEI message can be used by the decoder at the decoder side to perform an inverse warping process based on the warping information.

In an example, whether to perform the warping process for the plurality of input pictures is determined based on the global movement or motion jitter. If the warping process is determined to be performed for the plurality of input pictures at the encoder side and/or the corresponding decoded pictures at the decoder side, one or more steps of the process (1100) can be performed, as described in the disclosure. If the warping process is determined not to be performed, steps (S1110) and (S1120) are omitted. (S1130) can be adapted such that the plurality of input pictures is encoded and no SEI message is encoded.

Figure 12:
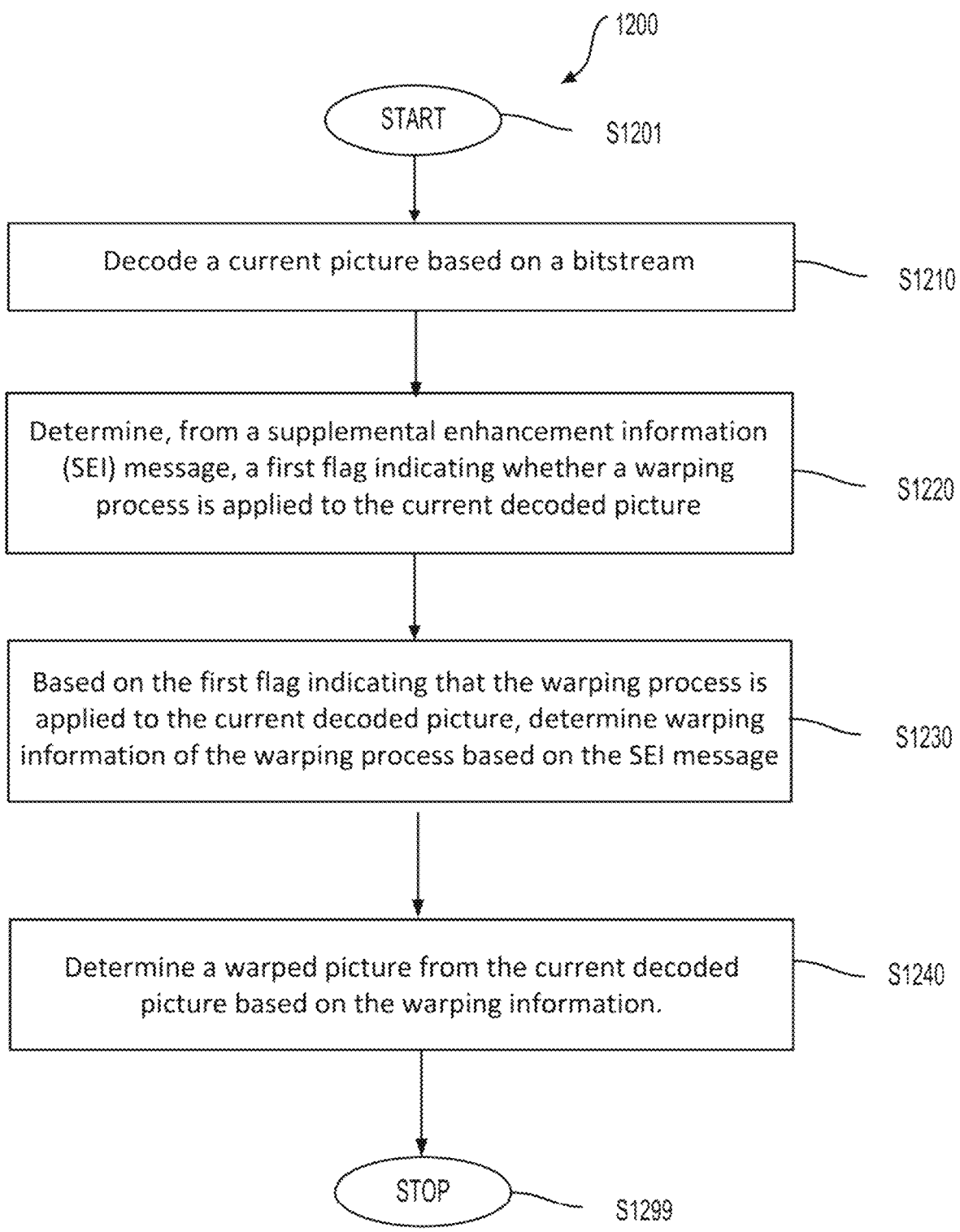
FIG. 12 shows a flow chart outlining a decoding process according to an embodiment of the disclosure.

FIG. 12 shows a flow chart outlining a decoding process (1200) according to an embodiment of the disclosure. The process (1200) can be used to decode a current picture in a bitstream and perform a warping process on the current decoded picture. In various embodiments, the process (1200) is executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1200) is implemented in software instructions, thus when the processing circuitry executes the software instructions, the processing circuitry performs the process (1200). The process starts at (S1201), and proceeds to (S1210).

At (S1210), a current picture can be decoded based on a bitstream.

At (S1220), first information (e.g., a first flag) indicating whether a warping process is applied to the current decoded picture can be determined from a SEI message. In an example, the SEI message is a display orientation SEI message in the bitstream, and the display orientation SEI message includes syntax elements (e.g., the first flag, the second flag, the warping mode identifier, and the corner vectors) such as shown in Table 2. In an example, the SEI message is a WDPR SEI message in the bitstream, such as described with reference to Table 2.

In an example, the first flag is denoted as the warping_based_decoded_picture_resampling_cancel_flag described above. The first flag being false (e.g., equal to 0) can indicate that warping information is included in the SEI message and the warping process is applied. The first flag (e.g., warping_based_decoded_picture_resampling_cancel_flag) being true (e.g., equal to 1) can indicate that the SEI message cancels the persistence of any previous WDPR SEI messages in an output order that applies to a current layer and no warping process is applied.

At (S1230), based on the first information (e.g., the first flag) indicating that the warping process is applied to the current decoded picture, the warping information of the warping process can be determined based on the SEI message.

The warping information can indicate warping parameters, such as four corner vectors (e.g., $v^{00}$, $v^{H0}$, $v^{0V}$, $v^{HV}$ shown in FIG. 9) between corners of the current decoded picture and corresponding corners of the warped picture. In some examples, the warping parameters include a vector (e.g., the vector (1001) or (1002) in FIG. 10B) indicating a shifting operation.

In an example, the warping information indicates a warping mode (e.g., the warping mode having a warping mode identifier of 0), and the four corner vectors can be determined based on the warping mode.

The warping information can include second information (e.g., a second flag). In an example, the second flag is denoted as the warping_based_decoded_picture_resampling_persistence_flag. The second flag having a first value (e.g., 0) indicates that the SEI message only applies to the current decoded picture. The second flag having a second value (e.g., 1) indicates that the SEI message applies to the current decoded picture and one or more subsequently decoded pictures of the current layer in an output order until a condition is satisfied. The condition can include one or more of the following (i) a new CLVS of the current layer begins; (ii) the bitstream ends; (iii) a picture in the current layer in an AU associated with a WDPR SEI message (e.g., different from the SEI message for the current decoded picture) is output that follows the current decoded picture in the output order.

At (S1240), a warped picture can be determined from the current decoded picture based on the warping information, such as the warping parameters. In an example, the warping parameters can include the four corner vectors (e.g., $v^{00}$, $v^{H0}$, $v^{0V}$, $v^{HV}$ shown in FIG. 9), and a vector between a sample position in the current decoded picture and a corresponding position in the warped picture can be determined based on the four corner vectors, for example, using Eq. 1.

In an example, the second flag has the second value indicating that the SEI message applies to the current decoded picture and the one or more subsequently decoded pictures of the current layer in the output order. A subsequent picture of the current layer that follows the current picture in the output order can be decoded. A subsequent warped picture can be determined from the subsequently decoded picture based on the warping information.

The process (1200) proceeds to (S1299), and terminates.

The process (1200) can be suitably adapted to various scenarios and steps in the process (1200) can be adjusted accordingly. One or more of the steps in the process (1200) can be adapted, omitted, repeated, and/or combined. Any suitable order can be used to implement the process (1200). Additional step(s) can be added.

In an example, based on the first flag indicating that the warping process indicated by a previous SEI message is cancelled, the warping process is not applied to the current decoded picture. Accordingly, the steps (S1230) and (S1240) are omitted.

The process (1200) can be used in certain applications such as image stabilization, as shown in FIG. 10A for example, and no corresponding warping process is performed on the encoder side. The process (1200) can be used as an inverse warping process to compensate for global movements, such as shown in FIG. 10B where a corresponding forward warping process is performed on the encoder side. In an example, the warping parameters in the SEI message is adapted based on whether the process (1200) is for image stabilization or is an inverse warping process to compensate for global movements. In an example, the warping parameters in the SEI message used for image stabilization or an inverse warping process in compensating for global movements are identical, and (S1240) can be adapted based on whether the process (1200) is for image stabilization or is an inverse warping process to compensate for global movements.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 13 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
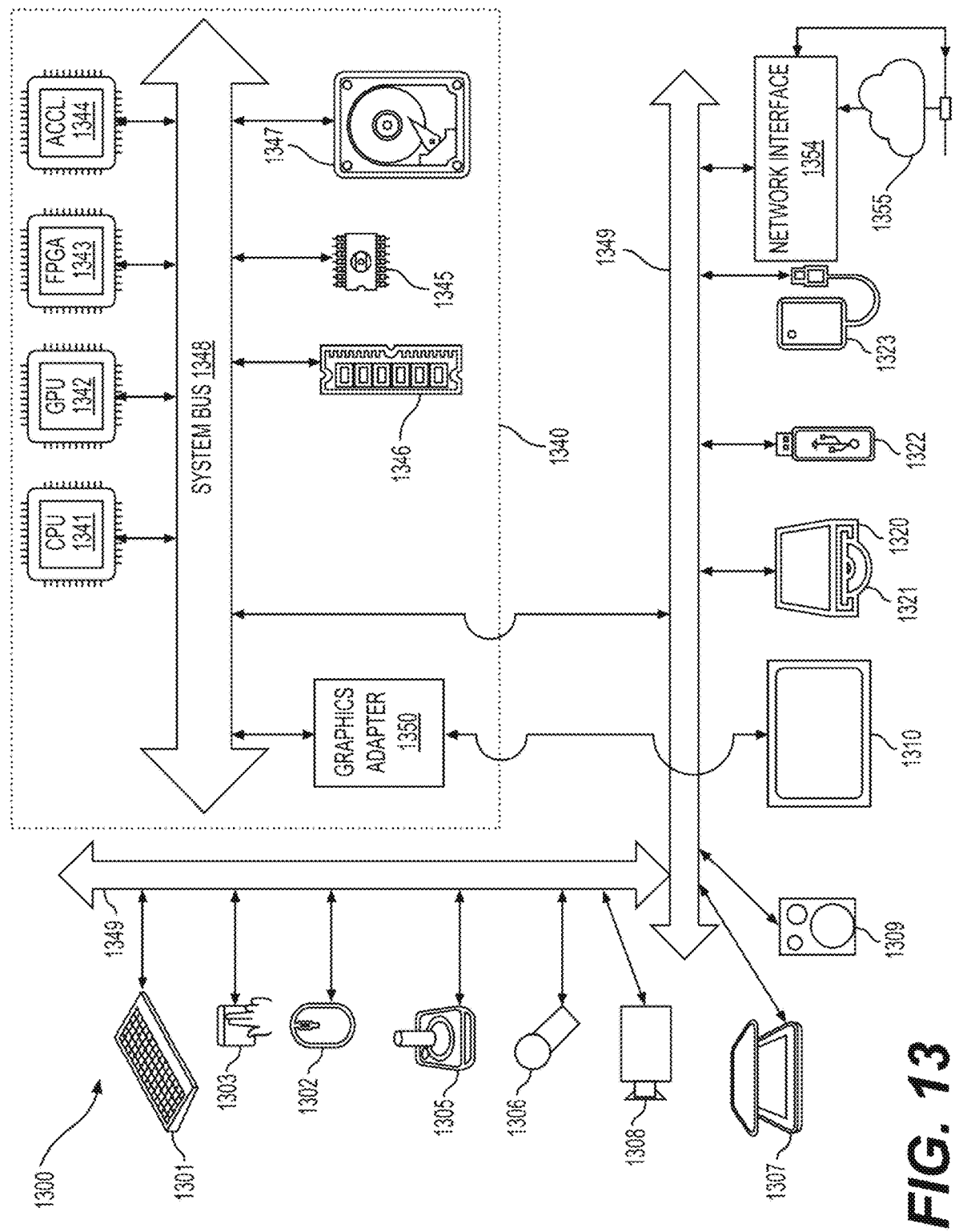
FIG. 13 is a schematic illustration of a computer system in accordance with an embodiment.

The components shown in FIG. 13 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include an interface (1354) to one or more communication networks (1355). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1349) (such as, for example USB ports of the computer system (1300)); others are commonly integrated into the core of the computer system (1300) by attachment to a system bus as described below (for example Ethernet interface into a PC computer system or cellular network interface into a smartphone computer system). Using any of these networks, computer system (1300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), graphics adapters (1350), and so forth. These devices, along with Read-only memory (ROM) (1345), Random-access memory (1346), internal mass storage such as internal non-user accessible hard drives, SSDs, and the like (1347), may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). In an example, the screen (1310) can be connected to the graphics adapter (1350). Architectures for a peripheral bus include PCI, USB, and the like.

CPUs (1341), GPUs (1342), FPGAs (1343), and accelerators (1344) can execute certain instructions that, in combination, can make up the aforementioned computer code. That computer code can be stored in ROM (1345) or RAM (1346). Transitional data can be stored in RAM (1346), whereas permanent data can be stored for example, in the internal mass storage (1347). Fast storage and retrieve to any of the memory devices can be enabled through the use of cache memory, that can be closely associated with one or more CPU (1341), GPU (1342), mass storage (1347), ROM (1345), RAM (1346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1300), and specifically the core (1340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1340) that are of non-transitory nature, such as core-internal mass storage (1347) or ROM (1345). The software implementing various embodiments of the present disclosure can be stored in such devices and executed by core (1340). A computer-readable medium can include one or more memory devices or chips, according to particular needs. The software can cause the core (1340) and specifically the processors therein (including CPU, GPU, FPGA, and the like) to execute particular processes or particular parts of particular processes described herein, including defining data structures stored in RAM (1346) and modifying such data structures according to the processes defined by the software. In addition or as an alternative, the computer system can provide functionality as a result of logic hardwired or otherwise embodied in a circuit (for example: accelerator (1344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC))

storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
R-D: Rate-Distortion While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a video decoder, comprising:
　　decoding a current picture based on a bitstream;
　　determining, from a supplemental enhancement information (SEI) message, a first flag indicating whether a warping process is applied to the current decoded picture;
　　based on the first flag indicating that the warping process is applied to the current decoded picture, determining warping information of the warping process based on the SEI message, and
　　determining a warped picture from the current decoded picture based on the warping information,
　　wherein the warping information indicates four corner vectors between corners of the current decoded picture and corresponding corners of the warped picture.

2. The method of claim 1, wherein the SEI message is a display orientation SEI message in the bitstream.

3. The method of claim 1, wherein the SEI message is a warping-based decoded picture resampling (WDPR) SEI message in the bitstream.

4. The method of claim 1, wherein the determining the warped picture comprises:
　　determining a vector between a sample position in the current decoded picture and a corresponding position in the warped picture based on the four corner vectors.

5. The method of claim 1, wherein
　　based on the first flag indicating that the warping process indicated by a previous SEI message is cancelled, the warping process is not applied to the current decoded picture.

6. The method of claim 1, wherein
　　the warping information includes a second flag,
　　based on the second flag having a first value, the SEI message only applies to the current decoded picture, and
　　based on the second flag having a second value, the SEI message applies to the current decoded picture and one or more subsequently decoded pictures of a current layer in an output order until a condition is satisfied.

7. The method of claim 6, wherein
　　the second flag has the second value, and
　　the method further includes
　　　　decoding a subsequent picture of the current layer that follows the current picture in the output order, and
　　　　determining a warped picture from the subsequently decoded picture based on the warping information.

8. The method of claim 6, wherein the condition includes a new coded layer video sequence (CLVS) of the current layer.

9. The method of claim 1, wherein
　　the warping information indicates a warping mode, and
　　the determining the warping information includes determining the four corner vectors based on the warping mode.

10. An apparatus for video decoding, comprising:
　　processing circuitry configured to:
　　　　decode a current picture based on a bitstream;
　　　　determine, from a supplemental enhancement information (SEI) message, a first flag indicating whether a warping process is applied to the current decoded picture;
　　　　based on the first flag indicating that the warping process is applied to the current decoded picture, determine warping information of the warping process based on the SEI message, and
　　　　determine a warped picture from the current decoded picture based on the warping information,
　　wherein the warping information indicates four corner vectors between corners of the current decoded picture and corresponding corners of the warped picture.

11. The apparatus of claim 10, wherein the SEI message is a display orientation SEI message in the bitstream.

12. The apparatus of claim 10, wherein the SEI message is a warping-based decoded picture resampling (WDPR) SEI message in the bitstream.

13. The apparatus of claim 10, wherein the processing circuitry is configured to:

determine a vector between a sample position in the current decoded picture and a corresponding position in the warped picture based on the four corner vectors.

14. The apparatus of claim 10, wherein
based on the first flag indicating that the warping process indicated by a previous SEI message is cancelled, the warping process is not applied to the current decoded picture.

15. The apparatus of claim 10, wherein
the warping information includes a second flag,
based on the second flag having a first value, the SEI message only applies to the current decoded picture, and
based on the second flag having a second value, the SEI message applies to the current decoded picture and one or more subsequently decoded pictures of a current layer in an output order until a condition is satisfied.

16. The apparatus of claim 15, wherein
the second flag has the second value, and
the processing circuitry is configured to
    decode a subsequent picture of the current layer that follows the current picture in the output order, and
    determine a warped picture from the subsequently decoded picture based on the warping information.

17. The apparatus of claim 15, wherein the condition includes a new coded layer video sequence (CLVS) of the current layer.

18. A non-transitory computer-readable storage medium storing a program executable by at least one processor to perform:
    decoding a current picture based on a bitstream;
    determining, from a supplemental enhancement information (SEI) message, a first flag indicating whether a warping process is applied to the current decoded picture;
    based on the first flag indicating that the warping process is applied to the current decoded picture, determining warping information of the warping process based on the SEI message, and
    determining a warped picture from the current decoded picture based on the warping information,
    wherein the warping information indicates four corner vectors between corners of the current decoded picture and corresponding corners of the warped picture.

* * * * *